Jan. 21, 1958  F. W. SMERZ  2,820,387
DEVICE FOR CUTTING ANNULAR GROOVE IN ANNULAR ARTICLE
Filed Oct. 8, 1953  2 Sheets-Sheet 1
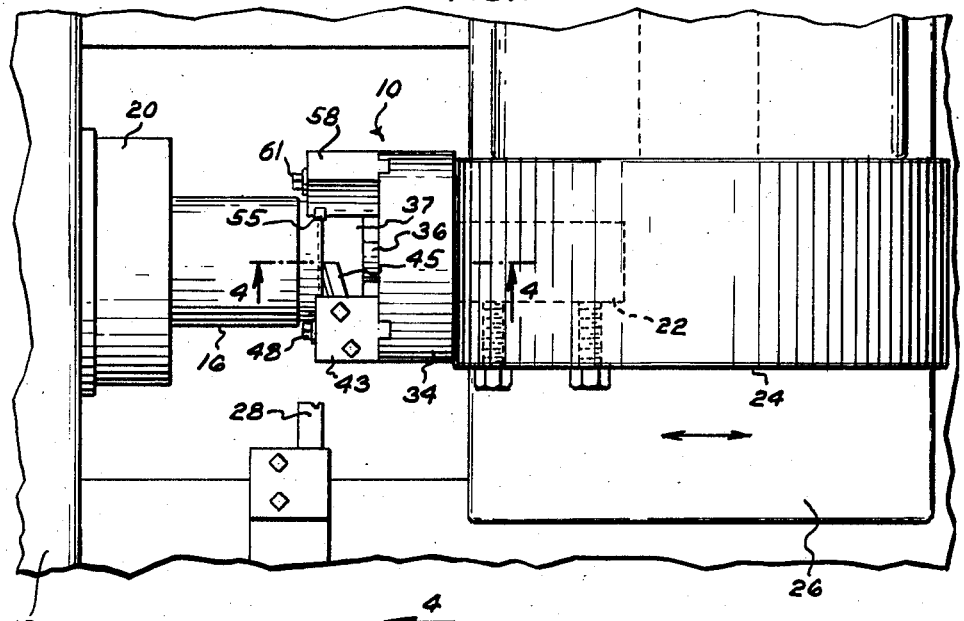
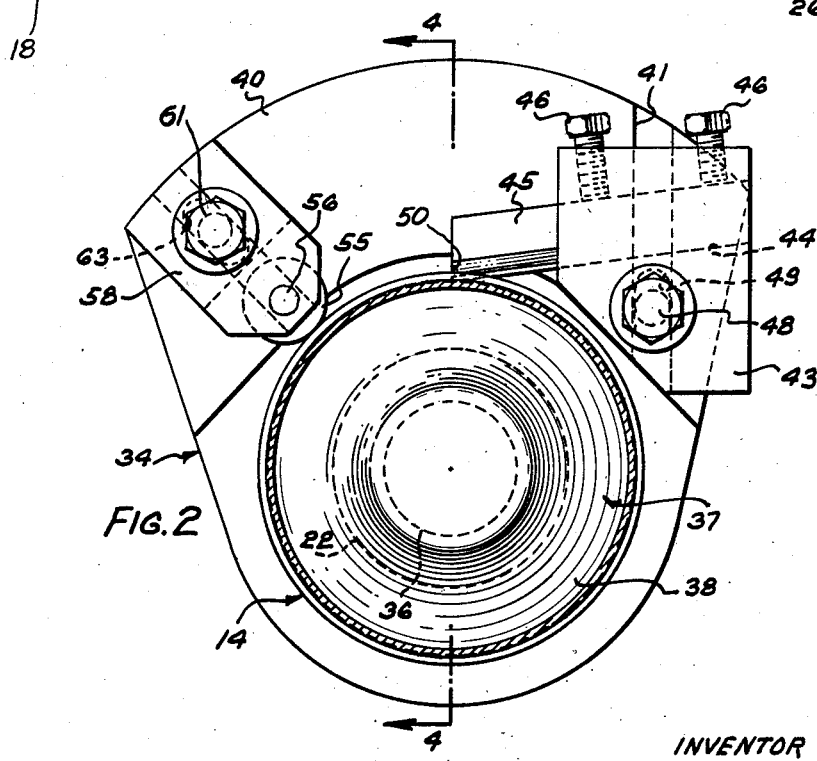
INVENTOR
F. W. SMERZ
BY C. B. Hamilton
ATTORNEY

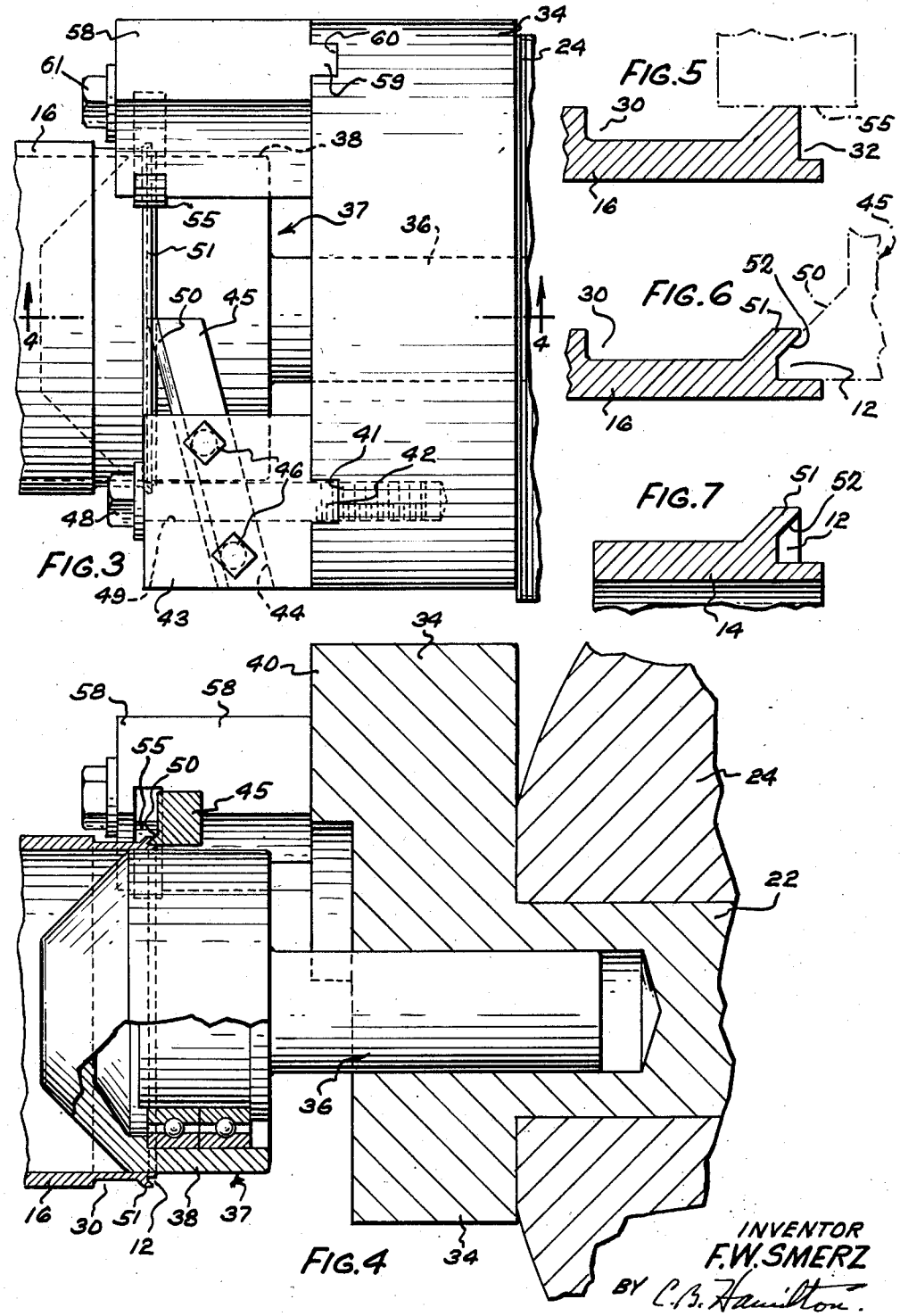

United States Patent Office 2,820,387
Patented Jan. 21, 1958

2,820,387

DEVICE FOR CUTTING ANNULAR GROOVE IN ANNULAR ARTICLE

Frank W. Smerz, Riverside, Ill., assignor to Western Electric Company, Incorporated, New York, N. Y., a corporation of New York Application October 8, 1953, Serial No. 385,020

1 Claim. (Cl. 82—35)

This invention relates to a device for cutting an annular groove in the end of a hollow cylindrical article adjacent the outer periphery thereof and for reshaping the thin outer annular wall deformed by the cutting tool during the cutting of the groove.

In the manufacture of electronic tubes of the magnetron type which have evacuated housings, some of the components of the housings are tubular in form and are provided with annular grooves in one end thereof for receiving therein the annular ends of other components, which ends are then bonded together to form hermetic seals therebetween. In cylindrical components having relatively thin walls, difficulty has been experienced in forming annular grooves in the end portions thereof.

It is an object of the invention to provide a device for forming annular grooves in the end portion of annular hollow cylindrical articles.

It is a further object of the invention to provide a device for cutting an annular groove in the end of an annular article adjacent the outer periphery thereof and for reforming the deformation produced in the outer annular wall by the cutting of the groove.

The invention contemplates the forming of an annular groove in the end portion of a thin walled tubular article by rotating the article about its axis and advancing a cutter parallel to the axis of rotation of the article and into engagement with the end face thereof to cut a groove therein having a conical outer wall portion adjacent the outer periphery of the article. During the cutting of the annular groove the thin annular wall formed between the annular groove and the outer periphery of said article is deformed radially outwardly by an oblique cutting edge of the tool and the deformed portion of the thin annular wall is pressed back to its proper normal position by a roller mounted in fixed relation to the cutter and engageable with the periphery of the article as the cutting operation proceeds.

Other objects and advantages of the invention will become apparent by reference to the following detailed description and the accompanying drawings illustrating a preferred embodiment thereof, in which Fig. 1 is a fragmentary diagrammatic plan view of a portion of an automatic screw machine with the device for cutting a groove in an annular part attached thereto;

Fig. 2 is an enlarged end view of the device for forming an annular groove in the end of an annular article;

Fig. 3 is a plan view of the device shown in Fig. 2;

Fig. 4 is a vertical longitudinal sectional view of the device taken on the lines 4—4 of Figs. 2 and 3;

Fig. 5 is an enlarged sectional view of a wall portion of the annular article at an intermediate stage of completion;

Fig. 6 is a view similar to Fig. 5 showing the groove cut in the end of the article; and Fig. 7 is a view similar to Fig. 6 of a portion of the finished article.

The present forming device 10 is designed to cut a groove 12 in the end portion of the annular articles or rings 14 (Fig. 7) which are formed on and cut from a tube 16 in a metal cutting machine 18 such as an automatic screw machine or the like. The tube 16 is adapted to be gripped in the chuck 20 (Fig. 1) of the screw machine and rotated about its axis with one end of the tube projecting outwardly from the chuck toward the forming device 10 which has a shank 22 disposed in a recess of a turret 24 and secured thereto. The turret 24 is mounted on a longitudinal slide or carriage 26 capable of moving the forming device 10 axially relative to the tube 16. A tool 28 carried on a cross slide of the screw machine is movable into engagement with the tube 16 to turn down a portion thereof to form a peripheral groove 30 and an annular rabbet 32 therein during the forming of the articles 14 and prior to the cutting of the annular groove 12 therein.

The forming device 10 comprises a head 34 secured to the shank 22. The shank 22 is hollow for receiving the shank 36 of a rotary supporting element 37 having a hollow cylindrical head 38 rotatably mounted on the forward end of the shank 36. The head 38 of the supporting member 37 has a diameter substantially equal to the inner diameter of the tube 16 and is adapted to fit within the tube and support the outer end thereof during the groove forming operation.

The head 34 of the forming device 10 has a forwardly projecting arcuate portion 40 in the front face of which is formed a vertical slot 41 for receiving a key 42 on a tool supporting block 43. The block 43 is provided with an obliquely disposed aperture 44 for supporting a cutting tool or blade 45 which is held in adjusted position therein by a pair of set screws 46 and the block 43 is vertically adjustable and is secured to the head 34 in adjusted position by a screw 48 passing through a slot 49 in the block 43. The blade 45 is disposed obliquely relative to the tube 16 with the forward lower end portion thereof having a cutting edge of a predetermined shape conforming to the cross section of the groove 12 and including an obliquely disposed edge 50 (Fig. 6). As the tube 16 is rotating the forming device 10 is moved axially a predetermined distance into the end of the tube 16 to cause the end of the cutting blade to cut the groove 12 therein close to the periphery of the tube to form a relatively thin outer wall 51 encircling the groove. The oblique cutting edge 50 of the blade forms a conical surface 52 on the wall 51 and during the groove cutting operation and the axial movement of the tool the obliquely disposed cutting edge 50 forces successive portions of the wall 51 radially outwardly with the result that the wall portion 51 is deformed outwardly from its normal and desired shape and has a diameter larger than required.

Means are provided for restoring the deformed portions of the wall 51 to its original proper position which comprises a cylindrical roller 55 rotatable on a pin 56 mounted in a block 58. The block has a key 59 formed thereon which is slidable in a radial slot 60 formed in the projecting portion 40 of the head 34 for guiding the block 58 and the roller 55 for radial movement relative to the tube 16. A bolt 61, which passes through a slot 63 in the block 58 and threadedly engages the head 34 serves to secure the block 58 and the roller 55 in adjusted position on the forming device 10. The block 58 is adjusted so that the periphery of the roller 55 is in alignment and engageable with the periphery of the tube 16 and the roller 55 is positioned laterally in alignment with the cutting end of the blade 45 so that it engages the wall portion 51 during the groove cutting operation and serves to press the outwardly deformed thin wall 51 inwardly to its original position. Thus, during the cutting operation as the cutting edge of the tool is advanced axially into the end of the tube and cuts progressively deeper therein and deforms successive portions of the wall 51 outwardly, the roller 55 engages successive portions of the deformed wall 51 and reforms it to its original position. Thus, during the groove cutting operation, portions of the wall 52 are progressively deformed outwardly by the tool and successively restored to its original position by the roller 55 until the cutting tool has reached its limit of advance movement, after which the tube 16 continues to rotate for several revolutions during which the tool cuts successively smaller sections from the wall 51 and deforms the wall outwardly less and less until the groove 12 has been fully cut and the wall 51 has been pressed back into its proper original position with the outer surface thereof having a true cylindrical form and of a predetermined diameter.

A résumé of the operation for forming the annular articles is as follows:

The tube 16 is properly positioned in the chuck 20 and rotated, after which the tool 28 on the cross slide is advanced to cut the annular groove 30 and the rabbet 32 in the tube. The forming device 10 is then advanced a predetermined distance to cause the cutting blade 45 to engage the end portion of the tube and to cause the roller 55 to engage the peripheral portion thereof. As the forming device 10 continues its advancing movement, the tool cuts progressively deeper into the end of the tube and deforms successive portions of the wall 51 and the roller 55 reforms the successive deformed portions of the wall 51 to their original position until the tool has reached the end of its advancing movement, after which the tube 16 continues to rotate and the roller 55 continues to reform the wall portion 52 to its original position while the cutting blade continues to cut progressively less metal from the wall until the full amount of metal has been removed therefrom and the outer surface of the wall 51 has been reformed to its proper cylindrical shape and size by the roller 55. Upon completion of the groove cutting operation the forming device 10 is moved away from the tube 16, after which a cut-off tool on a cross slide (not shown) is advanced to cut off the ring or annular article 14 (Fig. 7) from the tube 16.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A device for cutting an annular groove in the end of an annular article between its inner and outer peripheries thereby forming a relatively thin annular outer wall thereon comprising a holder, a cylindrical member rotatably supported on said holder engageable with the inner periphery of said annular article for supporting said article for rotation about its axis and for movement relative thereto in an axial direction, a cutting tool carried by said holder in fixed relation to the article supporting member and engageable with the end of said annular article for cutting an annular groove therein between the inner and outer peripheries, said tool having an oblique cutting edge which deforms the annular outer wall portion of said article radially outwardly during the cutting of said groove, and a roller having a cylindrical periphery carried by said holder in fixed and angularly spaced relation to said tool and positioned in an axial direction in alignment with the cutting portion of the tool to engage the periphery of said outer wall portion of the article as the annular groove is being cut therein to progressively reform the successive portions of the wall deformed by the tool.

References Cited in the file of this patent

UNITED STATES PATENTS

| | | |
|---|---|---|
| 794,989 | Kohler | July 18, 1905 |
| 1,230,974 | Abbott | June 26, 1917 |
| 1,820,056 | Drowns | Aug. 25, 1931 |
| 1,878,628 | Foster | Sept. 20, 1932 |
| 1,983,407 | Scholtes | Dec. 4, 1934 |
| 2,645,000 | Finch | July 14, 1953 |

FOREIGN PATENTS

| | | |
|---|---|---|
| 161,722 | Great Britain | Apr. 21, 1921 |
| 179,038 | Great Britain | May 4, 1922 |
| 181,130 | Great Britain | June 12, 1922 |
| 364,950 | France | Aug. 31, 1906 |